US006307465B1

(12) United States Patent
Kayama et al.

(10) Patent No.: US 6,307,465 B1
(45) Date of Patent: Oct. 23, 2001

(54) INPUT DEVICE

(75) Inventors: Shun Kayama, Saitama; Yasuhiro Kataoka; Kenji Munekata, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/549,025

(22) Filed: Apr. 13, 2000

(30) Foreign Application Priority Data

Apr. 12, 1999 (JP) ........................................ 11-104142

(51) Int. Cl.[7] .............................................. H04B 3/36

(52) U.S. Cl. ..................... 340/407.2; 345/167; 345/162; 345/157; 345/156; 345/163; 250/221; 250/229

(58) Field of Search ........................ 340/407.2; 345/167, 345/162, 157, 156, 163; 250/221, 229

(56) References Cited

U.S. PATENT DOCUMENTS 5,008,528 * 4/1991 Duchon ................................ 250/221
5,298,919 * 3/1994 Chang .................................. 345/163
5,543,821 * 8/1996 Marchis et al. ...................... 345/167
5,751,275 * 5/1998 Bullister ............................... 345/167
6,031,518 * 3/2000 Adams et al. ....................... 345/156
6,097,372 * 8/2000 Suzuki ................................ 345/167
6,104,969 * 8/2000 Beeks ....................................... 701/1

* cited by examiner

*Primary Examiner*—Jeffery Hofsass
*Assistant Examiner*—Tai T. Nguyen
(74) *Attorney, Agent, or Firm*—Ronald P. Kananen; Rader, Fishman & Grauer

(57) ABSTRACT

The invention provides a thin and small input device that improves a tactile operation sensation and a luxurious appearance. An input device to which an operator enters a desired command by operating it with a finger and which has a case, switch contacts disposed in the case, rotatable operation members disposed rotatably corresponding to the switch contacts that are partially projected from the holes of the case and pressed by an operator, and support members 44 for supporting the rotatable operation members by pressing it onto the case side and for operating the switch contacts when an operator presses the rotatable operation member against the pressing force.

7 Claims, 14 Drawing Sheets

(A)

ONE EXEMPLARY CASE

IT IS ALSO POSSIBLE TO GENERATE A VOLTAGE CORRESPONDING TO AN INPUT KEY CODE DETERMINED BY INTERNAL PROCESS OF A MICROCOMPUTER.

| INPUT KEY CODE | OUTPUT VOLTAGE RATIO |
|---|---|
| VOL+ | 0.5 |
| VOL− | 0.57 |
| STOP | 0.59 |
| PLAY/FF | 0.73 |
| REW | 0.9 |

* OUTPUT VOLTAGE
= OUTPUT VOLTAGE RATIO × Vcc

FIG. 7

INPUT KEY CODE DETERMINATION TABLE

| | (A) KEY TURNED ON FIRST | (B) KEY TURNED ON CURRENTLY | (C) INPUT KEY CODE |
|---|---|---|---|
| (D) | key0 | key0 | VOL+ |
| | key1 | key1 | INVALID |
| | key2 | key2 | STOP |
| | key3 | key3 | INVALID |
| | key4 | key4 | VOL- |
| | | | |
| (E) | key0 | key1 | PLAY/FF |
| | key1 | key2 | PLAY/FF |
| | key2 | key3 | PLAY/FF |
| | key3 | key4 | PLAY/FF |
| | | | |
| (F) | key4 | key3 | REW |
| | key3 | key2 | REW |
| | key2 | key1 | REW |
| | key1 | key0 | REW |

FIG. 8

INPUT KEY CODE DETERMINATION SEQUENCE

| | | |
|---|---|---|
| (A) | KEY SCAN<br>P10 TO P14 CONNECTED TO KEY SWITCHES ARE READ, CHECK WHICH KEY IS ON, AND SET AS THE KEY TURNED ON FIRST | |
| | switch (PERFORM KEY SCAN AGAIN IN A CERTAIN TIME) | |
| (B) | case THE SAME KEY IS ON: | SET INPUT KEY CODE DEFINED TO KEY |
| (C) | case NEIGHBORING KEY IS ON: | SET INPUT KEY CODE DETERMINED BY COMBINATION OF KEY TURNED ON FIRST AND KEY TURNED ON CURRENTLY |
| (D) | default OTHERS: | IGNORE KEY TURNED ON FIRST, AND SET KEY TURNED ON CURRENTLY AS KEY TURNED ON FIRST |

INPUT DEVICE

BACKGROUND OF THE INVENTION

This invention relates to an input device that an operator operates to enter the desired command.

The input devices shown in FIG. 15 and FIG. 16 have been known as input devices to which an operator enters a command through operation.

In the conventional input device shown in FIG. 15, key tops 1001 and 1002 are provided in a hole of a case 1000, and the key tops 1001 and 1002 are disposed correspondingly to a slide switch 1003 and a press switch 1004 respectively. The slide switch 1003 and the press switch 1004 are connected electrically to a substrate 1005. The operator slides the key top 1001 in the arrow direction to turn on/off the slide switch 1003. Similarly, the operator presses the key top 1002 in the arrow direction to turn on/off the press switch 1004.

In the conventional input device shown in FIG. 16, a sheet switch 1010 is provided on the case 1011. Electrodes 1012 of the sheet switch 1010 are connected electrically to a connector 1015 of the substrate 1014 though a flexible member 1013. The sheet switch 1010 has emboss-like projections 1016. A projection 1016 is pressed to on/off to operate the corresponding electrode 1012.

In the case of the conventional input device shown in FIG. 15, it is required that a key top 1001 or 1002 be provided on the case 1000, and a key top 1001 or 1002 and a slide switch 1003 or a press switch 1004 are provided between the substrate 1005 and the case 1000. Therefore, it is difficult to make the input device thin and small.

In the case of the conventional input device showing FIG. 16, it is possible to make the input device thin because the sheet switch 1010 is used, but it is difficult to give an operational tactile sensation and a luxurious appearance.

The present invention has been developed to solve the above-mentioned problem, and it is the object of the present invention to provides an input device that can be made thin and small and that can give a tactile operational sensation and luxurious appearance.

SUMMARY OF THE INVENTION

According to one aspect of the present invention, there is provided an input device into which an operator enters desired commands by operating with a finger that is comprised of a case, a switch contact provided in the inside of the case, a rotatable operation member for being pressed by an operator provided rotatably corresponding to the switch contact and disposed partially projecting from a hole of the case, and a support member that supports the rotatable operation member by pressing it onto the case side and that operates the switch contact against the pressing force when the operator presses the support member.

According to the aspect, the rotatable operation member is provided rotatably corresponding to the switch contact and disposed partially projecting from the hole of the case.

The support member supports the rotatable operation member by pressing it onto the case side and operates the switch contact against the pressing force when the operator presses the support.

As the result, the input device can be made thin and small, and good tactile operational sensation is given to the operator because the rotatable operation member is rotated when the operator presses it. In particular, because rotatable members are rotated when the operator moves a finger slidingly to operate a plurality of rotatable members, good tactile operation sensation is given to the operator. Because the operation rotatable member is projected partially from the hole of the case, the input device gives a luxurious appearance.

If the contacts are sealed, it is rendered reliable.

According to another aspect of the present invention, there is provided an input device described above in which a slit is formed on the case, and the rotatable operation member is disposed in the slit.

According to the aspect, the slit is disposed along the rotatable operation members in the case, and the operator can successively touch and press the rotatable operation members only by moving a finger along the slit. At that time, because the rotatable operation members are rotated when a finger touches the rotatable operation members, the input device gives the operator a good tactile operational sensation and gives a luxurious appearance.

If the contacts are sealed, it is rendered reliable.

According to another aspect of the present invention, there is provided an input device described above in which the input device has a plurality of the switch contacts, a plurality of the rotatable operation members and a microcomputer for selecting an operational mode from among different operational modes by operating an arbitrary switch selectively from among the plurality of switch contacts.

According to the aspect, a different operational mode can be selected by operating an arbitrary switch selectively from among a plurality of switches, and the total number of switches can be reduced. In detail, the computer selects an arbitrary mode from among the plurality of operational modes based on a combination of arbitrary switches.

According to another aspect of the present invention, there is provided an input device described above in which the operator moves a finger along the slit thereby to operate an arbitrary switch contact selectively from among a plurality of switch contacts for activating a desired operational mode.

According to the aspect, the operator moves a finger along the slit to select an arbitrary switch for activating a desired operational mode.

Thereby, only by moving a finger along the slit, the operator can select a desired operational mode simply.

According to another aspect of the present invention, there is provided an input device described above in which each switch is assigned to one type of operation.

According to the aspect, each switch can be assigned to one type of operation.

According to another aspect of the present invention, there is provided an input device described above in which the moving direction of a finger of the operator is the first direction along the longitudinal direction of the slit or the second direction that is opposite to the first direction.

According to the aspect, the operational mode can be selected by moving in the first direction along the longitudinal direction of the slit and the second direction that is opposite to the first direction.

According to another aspect of the present invention, there is provided an input device described above in which when the switch is operated a plurality of times in a predetermined time, the device is operated in an operational mode corresponding to the number of repeated operations.

According to the aspect, by operating one switch two or more times in a predetermined time, the device is operated in the operational mode corresponding to the number of repeated operations.

BRIEF DESCRIPTION OF THE DRAWINGS

FIG. 7 is a diagram for showing an exemplary determination table for the input key code.

FIG. 8 is a diagram for showing the exemplary determination sequence for the input key code.

DETAILED DESCRIPTION OF THE PREFERRED EMBODIMENTS

The preferred embodiments will be described in detail hereinafter with reference to the attached drawings.

The embodiments described hereinafter are preferred examples of the present invention. Various technically preferable limitations are included, but the scope of the present invention will not be limited by any of these embodiments, unless otherwise specified in the description hereinafter.

Figure 1:
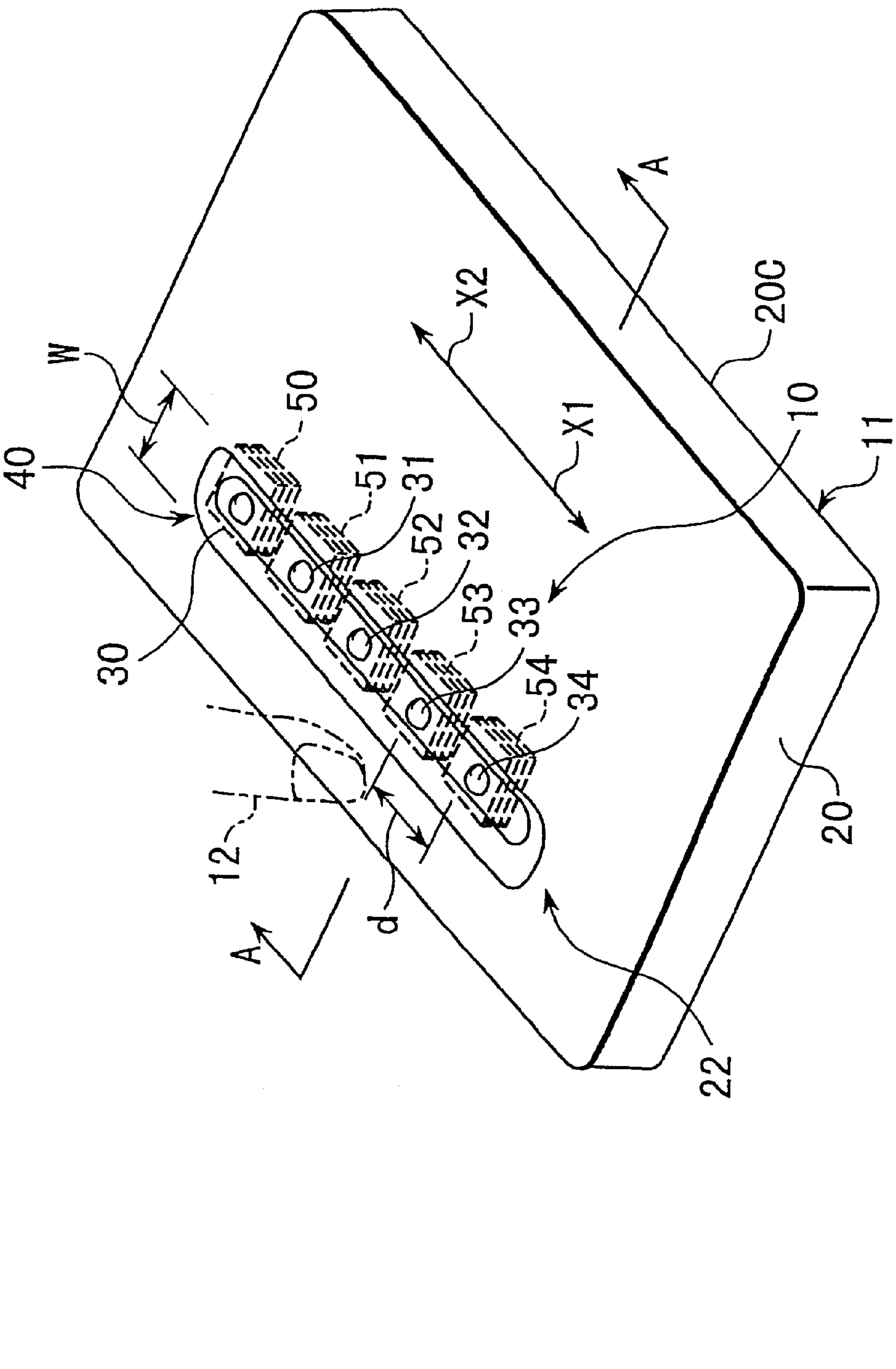
FIG. 1 is a perspective view for illustrating a preferable input device of the present invention.

FIG. 1 shows a preferred embodiment of an input device of the present invention. This input device 10 is an input device to which an operator enters desired commands by touching with a finger. In this embodiment, the input device 10 is provided in a portable music player 11 for reproducing music data, as an example; and, when an operator enters a desired command to the input device 10, the music player 11 reproduces, for example, the music data.

The input device 10 has a case 20 and key operation unit 22. The case 20 is formed of material such as plastic or metal. When the case 20 is formed of plastic, for example, ABS (acrylonitrile-butadiene-styrene), ABS-PC (acrylonitrile-butadiene-styrene-polycarbonate), PA (polyamide), or LCP (liquid crystal polymer) may be used. When the case 20 is formed of metal, for example, a material such as Mg alloy, Al alloy, or Zn ally may be used.

Figure 2:
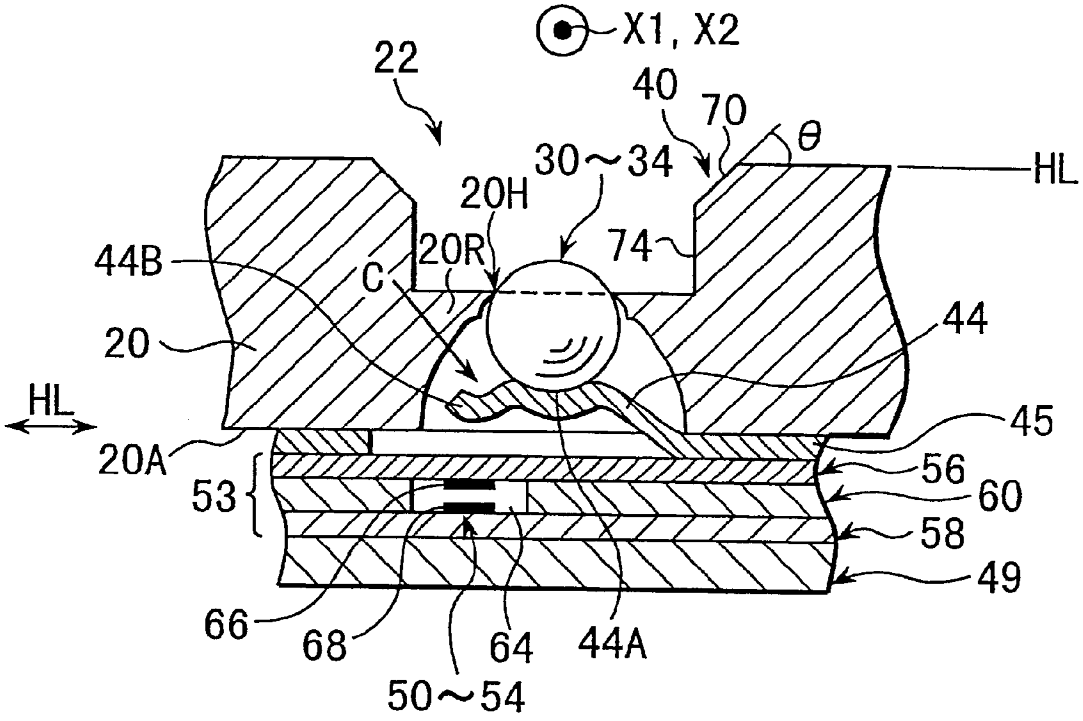
FIG. 2 is an exemplary cross section along the line A—A of the input device shown in FIG. 1.

FIG. 2 is an exemplary cross sectional view along the line A—A in FIG. 1. The operation unit 22 has rotatable operation members 30 to 34, as shown in FIG. 1 and FIG. 2. These rotatable operation members 30 to 34 are disposed preferably in series in the slit 40 in the case 20 of the input device 10 with a predetermined distance interval d.

As shown in FIG. 2, a portions of the respective rotatable operation members 30 to 34 project from the holes 20H of the case 20.

Figure 3:
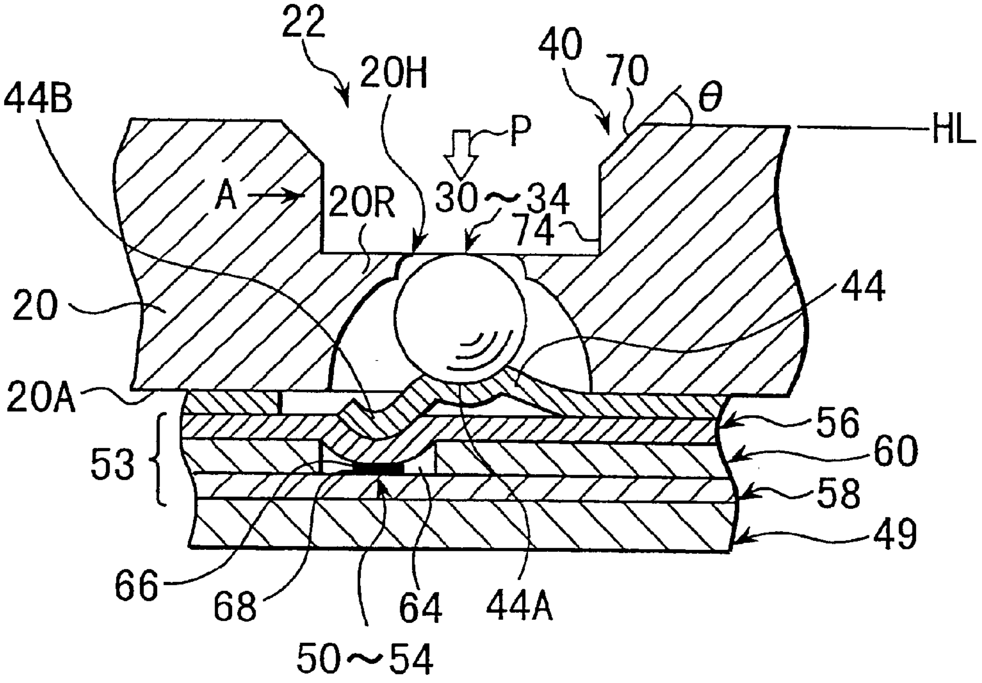
FIG. 3 is a diagram for illustrating a rotatable member that is being pressed in FIG. 2.

FIG. 2 and FIG. 3 are enlarged views of the vicinity of the key operation unit 22 and the slit 40.

In FIG. 2 and FIG. 3, the rotatable operation members 30 to 34 are preferably spherical and may be made of, for example, electrical insulating material or metal material. If plastic material is used, for example, PET (polyethyleneterephthalate), PI (polyimide), POM (polyacetal), LCP (liquid crystal polymer), PPS (polyphenylenesulfide), or PBT (polybutyleneterephthalate) may be used.

Otherwise if metal material is used, for example, a ball made of metal such as stainless steel, carbon steel, or hard metal may be used.

Support members 44 are provided corresponding to the respective rotatable operation members 30 to 34. A support member 44 is obtained, for example, by punching an elastic plate member 45, as exemplarily shown in FIG. 9. The support member may be formed of, for example, metal or resin.

When the support member 44 is formed of metal, material used for springs, such as phosphor bronze, beryllium copper, or SUS, may be used. When the support member 44 is formed of resin, PVC (polyvinylchloride), POM (polyacetal), or ABS (acrylonitrile-butadiene-styrene) may be used.

As shown in FIG. 2 and FIG. 3, support member 44 has a receiving portion 44A for receiving one of the rotatable operation members 30 to 34 and an operation end 44B for operating one of the electrodes 66 and 68 in contact, as described hereinafter. The support member 44 is formed from the elastic sheet shown in FIG. 9 in the form of an overhanging type. FIG. 2 shows the support member 44 in the state when an operator does not press the rotatable operation members 30 to 34, and the support member 44 presses the ball up against the periphery 20R side of the hole 20H of the case 20 by means of elastic deformation force.

On the other hand, when the operator presses one of the rotatable operation members 30 to 34 with a finger in the P-direction, as shown in FIG. 3, the one of rotatable members 30 to 34 leaves from the periphery 20R of the hole 20H. The diameter of the hole 20H is smaller than the diameter of each of the rotatable members 30 to 34.

Switch contacts 50 to 54 are disposed correspondingly to respective rotatable operation members 30 to 34, as shown in FIG. 1 to FIG. 3. The switch contacts 50 to 54 are disposed in the sheet switch 53.

The sheet switch 53 is held between a reinforcing plate 49 and a sheet 56 and has electrical insulating sheet members 56 and 58 and an electrical insulating spacer 60. The spacer 60 is disposed between the sheet members 56 and 58 to form a space 64.

In the space 64, the switch contacts 50 to 54 are disposed. One-side electrodes 66 of the switch contacts 50 to 54 are formed on the bottom surface of the sheet member 56, and the other- side electrodes 68 of the switch contacts 50 to 54 are formed on the top surface of the sheet member 58.

These electrodes 66 and 68 are disposed facing each other with a predetermined distance interval. The switch contacts 50 to 54 are disposed separately from each other so as to correspond to respective rotatable operation members 30 to 34.

As shown in FIG. 2 and FIG. 3, a portion of the inner surface of the case 20 that forms the slit 40 has a slope 70. The slope 70 is inclined a predetermined angle θ, preferably 30 degrees, with respect to the horizontal line HL of the case 20, but the angle may be in the range from 15 degrees to 60 degrees. A portion of the inner surface that forms the slit 40 is inclined to form the slope 70. Slope 70 is advantageous in that the finger 12 of the operator shown in FIG. 1 is guided surely to the rotatable operation members 30 to 34.

The finger 12 is easily slidable along the slope 70 in the X1 direction or X2 direction in FIG. 1, and by sliding the finger 12, an arbitrary rotatable member selected from among the plurality of rotatable operation members 30 to 34 is operated easily.

As described above, a rotatable member is rotated when a finger 12 slides and touches the rotatable member and the rotatable member is moved down in P-direction in FIG. 3 against the elastic deformation force of the support member 44 As a result, the operation causes the click sensation, and the tactile operation sensation is improved.

In addition, unlike the conventional input device having a sheet switch on which projections are provided, the input device of the present invention gives a luxurious appearance. The slope 70 is connected to the vertical wall 74, as shown in FIG. 2 and FIG. 3. The slope 70 and the vertical wall 74 constitute the slit 40.

Figure 11:
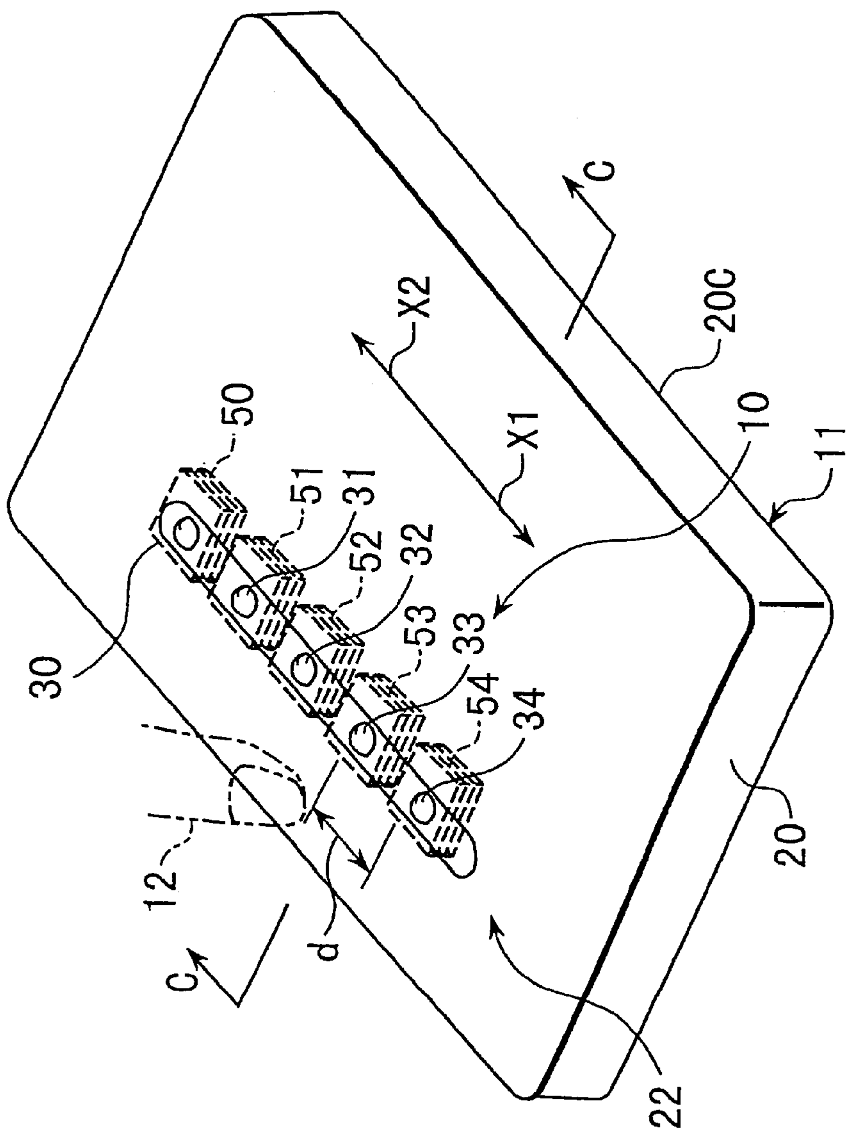
FIG. 11 is a perspective view for illustrating another embodiment of the input device of the present invention.

The width W of the slit 40 shown in FIG. 11 is, for example, preferably 3 to 10 mm; and, it is desirable that the shape of the slope 70 of the slit 40 that supports the finger 12 cushion is such that the finger 12 cushion does not directly press in the sheet switch 53 shown in FIG. 2.

As shown in FIG. 2, it is desirable that the height of the portion of the rotatable members 30 to 34 projected from the hole 20 are smaller than the depth of the slit 40. The reason is that the switch is prevented from being unintentionally turned on while being unused.

Figure 9:
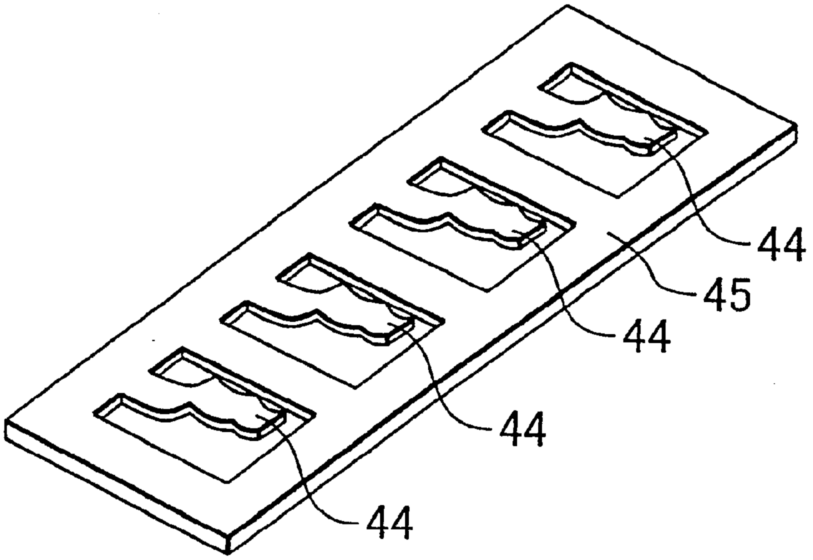
FIG. 9 is a perspective view for illustrating the exemplary support members formed for rotatable operation members.

FIG. 9 shows an exemplary elastic sheet 45 and support members 44, which are shown in FIG. 2 and FIG. 3. The support members 44 are formed by punching or cutting sheet 45.

Figure 4:
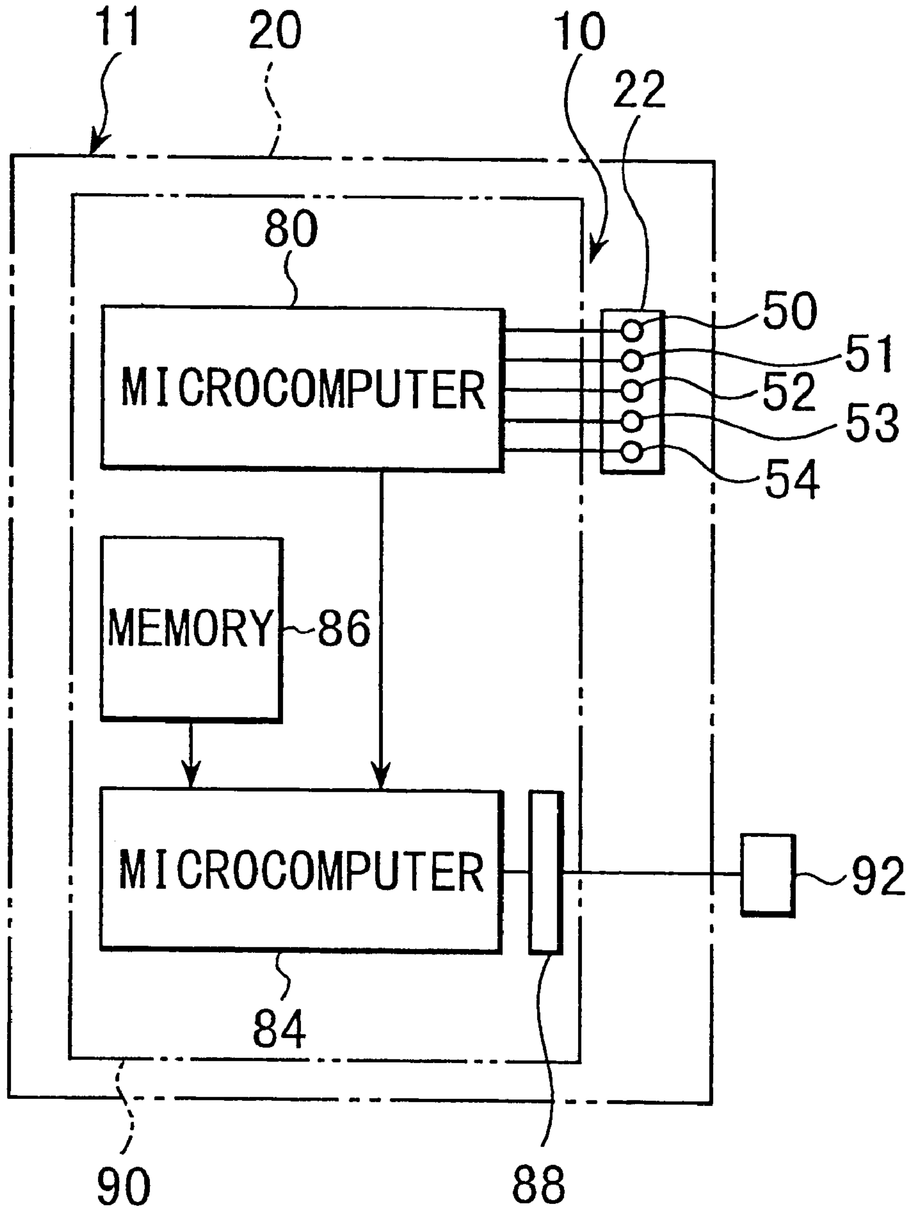
FIG. 4 is a diagram for describing an exemplary electrical connection in the input device.

Next, FIG. 4 shows an exemplary electric connection between the input device 20 shown in FIG. 1 and a component of a music player 11. A microcomputer 80 used exclusively for key input, a microcomputer 84 used for integral control, and a memory 86 for storing, for example, arbitrary music data are provided in the case 20.

The microcomputers 80 and 84 and the music data amplification output unit 88 constitute a circuit unit 90, and the circuit unit 90 is contained in the space of the case 20. The microcomputer 80 is connected to the switch contacts 50 to 54 of the above-mentioned key operation unit 22. The microcomputer 80 is connected to the microcomputer 84 used for integral control. The memory 86 is connected to the microcomputer 84 used for integral control. The microcomputer 84 controls the microcomputer 80, memory 86, and audio the amplification output unit 88.

The microcomputer 84 is connected to the music data amplification output unit 88. The music data amplification output unit 88 amplifies the music data supplied from the memory 86 through the microcomputer 84 and supplies the music data to, for example, an output unit 92, such as a headphone or earphone. An operator can hear the music data by means of the output unit 92.

The music data supplied from the output unit 82 may be other type of audio data a than music data.

For example, a semiconductor memory or memory of another type may be used as the memory 86. The memory 86 may be fixed to the circuit unit 90 or may be detachable from the circuit unit 90. It is possible to write information, such as music data, directly through a communication network, such as the Internet, in the memory 86.

For example, a flash memory, D-RAM (dynamic random access memory), or S-RAM (static random access memory) may be used as a semiconductor memory. A memory of another type, such as a hard disk, an optical disc, or a magneto-optical disc, may be used.

Figure 5:
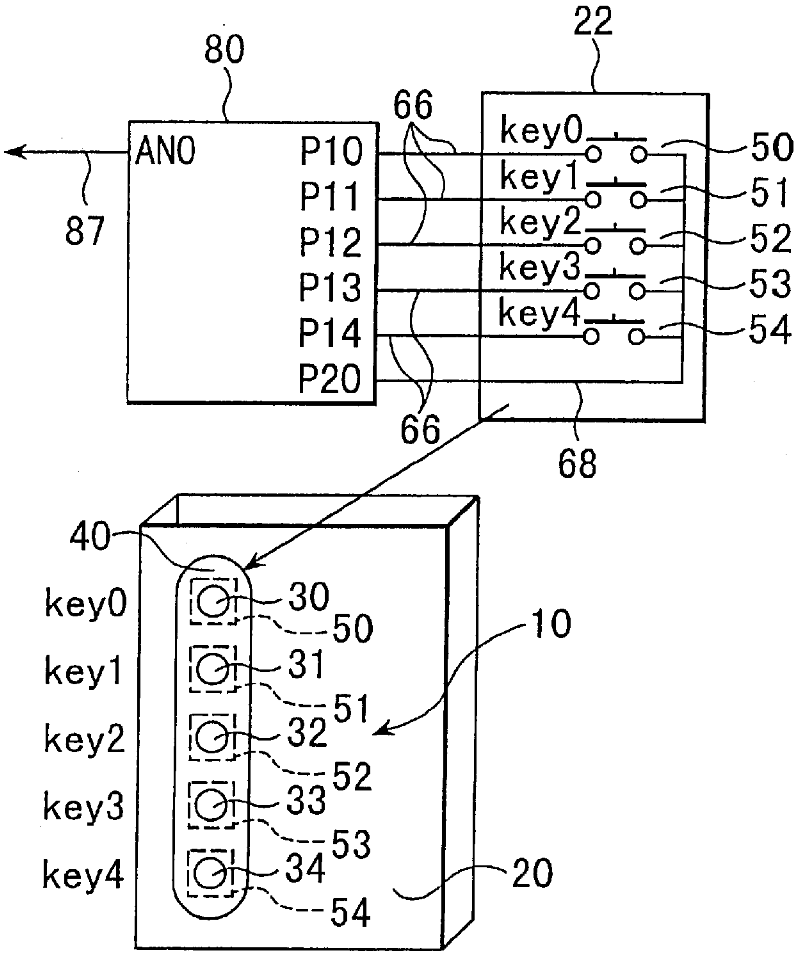
FIG. 5 is a diagram for describing the connectiing relation between a microcomputer and a key operation unit shown in FIG. 4.

FIG. 5 shows an exemplary connection between the microcomputer 80 and the switch contacts 50 to 54 of the key operation unit 22. In FIG. 5, the switch contacts 50 to 54 correspond to key 0 to key 4, respectively. The electrodes 66 shown in FIG. 3, of the switch contacts 50 to 54 are connected to ports P10 to P14 of the microcomputer 80, respectively, as shown in FIG. 5. A port P20 of the microcomputer 80 is connected to an electrode 68 that is common for the switch contacts 50 to 54.

The output unit 87 of the microcomputer 80 can generate a voltage corresponding to the input key code determined by means of the internal process of the microcomputer 80, as shown in (A) of FIG. 5. Examples of key input codes and output voltage ratios are shown in (A) of FIG. 5.

The input key code VOL+ shown in (A) of FIG. 5 has a function to increase the sound volume of the music data amplification output unit 88 shown in FIG. 4 and has a voltage ratio of 0.5. The input key code VOL− has a function to reduce the sound volume and has a voltage ratio of 0.57. The input key code STOP a function to stop the reproduction of the music data and has an output voltage ratio of 0.69. The input key code PLAY/FF shows an exemplary case in which the music data are sent from the memory 86 to output unit 92 shown in FIG. 4 and in which the music data are fed forward, and the output voltage ratio is 0.73. The input key code REW shows a function to return the reproduction position of the music data in the memory 86 shown in FIG. 4 and the output voltage ratio is 0.9.

The output voltage ratio is defined as output voltage=output voltage ratio×Vcc.

Vcc denotes a reference voltage, that is, for example, 5 V.

Figure 6:
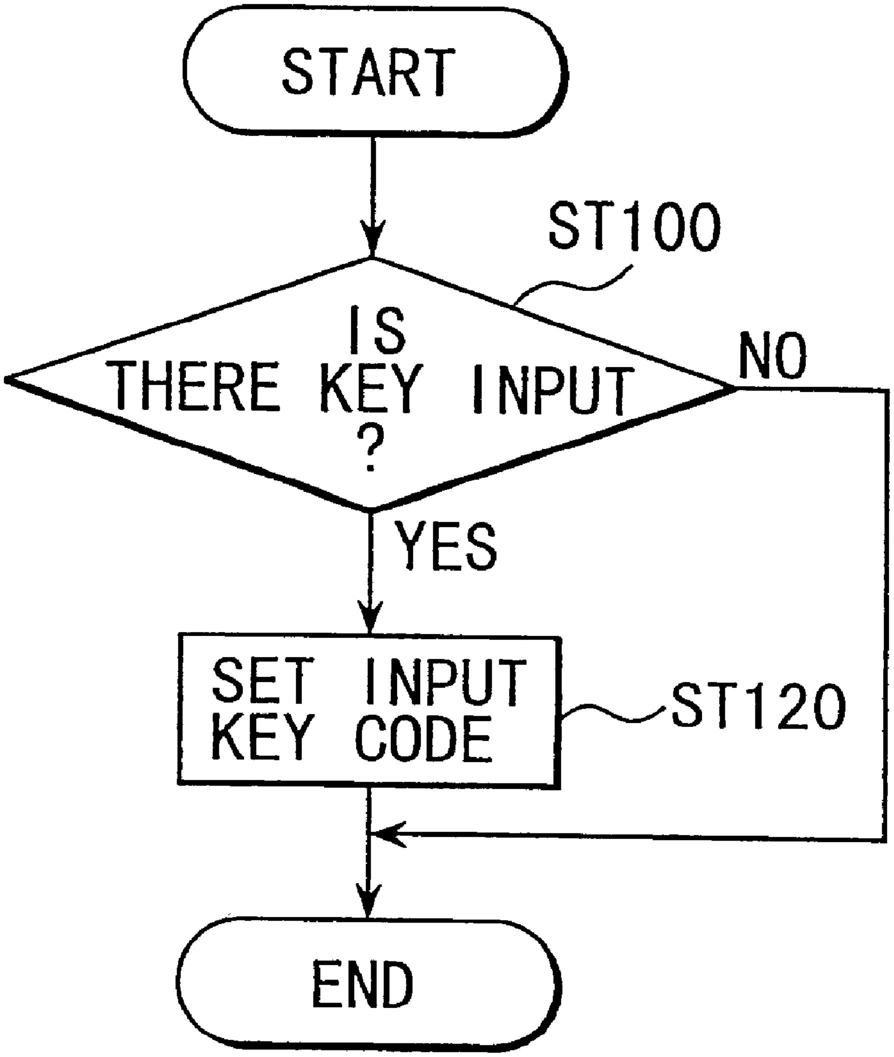
FIG. 6 is a diagram for describing the flow of the key operation.

FIG. 6 shows an exemplary key input operation of the input device 10 shown in FIG. 1 to FIG. 3.

For example, in FIG. 6, any one of the switch contacts 50 to 54 shown in FIG. 2 detects whether a key input is entered in step SP 100. Then an input key code, as shown in FIG. 7, is set in step SP 120.

FIG. 7 shows an example of an input key code determination table.

In the example of the input key code determination table shown in FIG. 7, the key turned on first (switch contact) is shown in column (A), the key turned on currently (switch contact) is shown in column (B), and an exemplary input key code is shown in column (C).

The input key code determination table contains rows (D), (E), and (F) in FIG. 7.

In row (D) of FIG. 7, various input key codes defined by means of combinations of keys turned on first shown in column (A) of FIG. 7 and keys turned on currently are shown. For example, when the key turned on first is key0 and the key turned on currently within a certain time is key0, in other words, the same key is pressed twice within a certain time, the input key code is VOL+ (volume is increased). When the key turned on first is key 1 and the key turned on currently within a certain time is the same key1, the input key code is invalid. Similarly, when the key turned on first is key 3 and the key turned on currently within a certain time is key3, the input key code is invalid.

When the key turned on first is key2 and the key turned on currently within a certain time is key2, then the input key code is STOP (reproduction of the music data is stopped). When the key turned on first is key 4 and the key turned on currently within a certain time is key4, the input key code is VOL− (volume is decreased).

In row (E) of FIG. 7, when the key turned on first is different from the key turned on currently within a certain time in the combination, the input key code activates PLAY/FF function. For example, when the key turned on first is key0 and the key turned on currently within a certain time is key1, then the input key code is PLAY (music data reproduction operation) /FF (music data reproduction position forward feeding operation).

Row (E) in FIG. 7 shows the case in which the key number of the key turned on first is smaller than the key number of the key turned on currently. On the other hand, row (F) in FIG. 7 shows the case where the key number of the key turned on first is larger than the key number of the key turned on currently. In this case, the input key code is REW (operation for returning the music data reproduction position). For example, when the key turned on first is key4 and the key turned on currently within a certain time is key3, the input key code is REW.

FIG. 8 shows an example of an input key code determination sequence.

In the case of (A) in FIG. 8, the microcomputer 80 shown in FIG. 5 checks ports P10 to P14 and determines what port is turned on among the ports P10 to P14 connected to the key operation unit 22 and sets the determined port as the key turned on first.

As a matter of course, the software process, such as chattering removal and noise removal, is applied internally when the port is checked so that wrong pressing of a key is avoided without any intention of pressing the key by an operator or so that pressing the key wrongly due to external electromagnetic wave noise is avoided.

Afterwards, a switch is pressed once more in any mode out of the modes shown in (B) to (D) in FIG. 8. In other words, any key is pressed again within a certain time.

In (B) of FIG. 8, the same key is turned on within a certain time, and the input key code shown in row (D) of FIG. 7 is exhibited.

In the state that the neighboring key is on as shown in (C) of FIG. 8, the PLAY/FF or REW function is set by means of combination of row (E) or row (F) in FIG. 7.

(D) in FIG. 8 shows an exemplary case of another key code operation In this case, the function of the key turned on first is ignored, and the key newly turned on currently is set as the key turned on first. This case is an exemplary case in which the key turned on first shown in row (A) of FIG. 7 is pressed and then the key turned on currently is pressed after a certain time has elapsed.

Next, an exemplary operation for use of the input device 10 shown in FIG. 1 to FIG. 3 is described.

An operator moves a finger along the longitudinal direction X1 of the slit 40 or along the opposite direction namely X2 direction as shown in FIG. 1, and presses a plurality of rotatable members successively or one rotatable member.

In this case, because the slope 70 of the slit 40 shown in FIG. 2 and FIG. 3 surely guides the finger 12 cushion to any one of rotatable operational members 30 to 34 of the key operation unit 22, the operator can surely touch a rotatable member without missing. Furthermore, because the slope 70 supports a portion of the finger 12 cushion and the finger 12 cushion does not exert a needless force on the sheet switch 53, the performance of the sheet switch 53 and switch contacts 50 to 54 is prevented from being deteriorated.

When the finger leaves from the rotatable member, the rotatable member is pressed up by means of the elastic force of the support member 44, the electrodes 66 and 68 are disconnected from each other and the switch is turned off.

For example, as shown in FIG. 7, when an operator presses the operational rotatable member 30 shown in FIG. 1 a plurality of times, for example, twice in a certain time, in row (D) of FIG. 7, the microcomputer 80 shown in FIG. 5 sends a control signal that indicates the input key code VOL+ to another microcomputer 84 shown in FIG. 4. Thereby, the microcomputer 84 gives the control signal to the music data amplification unit 88 and the volume of the music data generated from the output unit 92 is increased.

When, for example, the operational rotatable member 30 (key0) shown in row (E) of FIG. 7 is pressed and then the operational key 31 (key1) is pressed after a certain time has elapsed, the input key code PLAY/FF is activated, and a PLAY/FF control signal is sent from the microcomputer 80 shown in FIG. 4 to the microcomputer 84. Thereby, the microcomputer 84 performs reproduction of the music data in the memory 86 from the output unit 92 or forward feeding of the reproduction position. The forward feeding leads to head finding of the next music.

When, for example, the operation rotatable member 34 (key4) and the operation rotatable member 33 (key3) are pressed within a certain time period, as shown in row (F) of FIG. 7, the microcomputer 80 activates the input key code REW function. Thereby, the microcomputer 80 shown in FIG. 4 gives a REW control signal to the microcomputer 84, and the microcomputer 84 returns the music data in the memory 86 to a certain reproduction position.

As described above, when an operator touches an arbitrary number of rotatable members out of the plurality of rotatable members 30 to 34 successively with a finger 12, the operator can touch the rotatable member surely only by sliding the finger in either the X1 direction or the opposite direction, namely X2 direction, along the longitudinal direction of the slit 40. Furthermore, only by providing several operational rotatable members 30 to 34, various functions as shown in FIG. 7, can be selected by the simple use of a finger of an operator. The input key code determination table used in this case can be displayed on, for example, the backside of the case 20 shown in FIG. 1.

Figure 10:
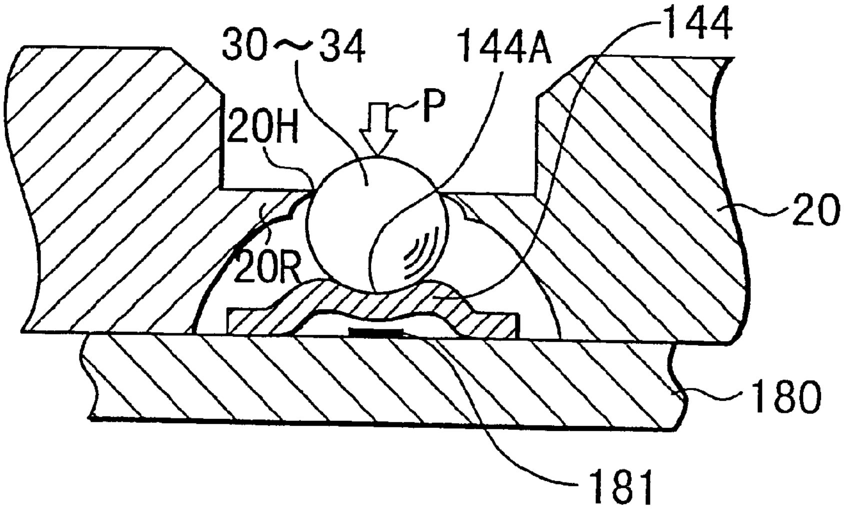
FIG. 10 is a cross sectional view for illustrating another embodiment of the input device of the present invention.

FIG. 10 shows another embodiment of the present invention, and the embodiment shown in FIG. 10 corresponds to the embodiment shown in FIG. 2. The embodiment shown in FIG. 10 is the same as the embodiment shown in FIG. 2 excepting that the configuration of the support member 144 and switch 181 of the substrate 180 is different. An on/off switch 181 is provided on the substrate 180. The support member 144 is fixed on the substrate 180 corresponding to the switch 181. The support member 144 is otherwise called as inversion plate and is formed of elastic metal or plastic. Each of the rotatable operation members 30 to 34 is placed on a recess 144A of the support member 144 at the position corresponding to the support member 144, and a part of each of the rotatable members 30 to 34 is projected from the hole 20H of the case.

When an operator presses one of the rotatable members 30 to 34 in the P-direction, the support member 144 is pressed toward the switch 181 side of the substrate 180, and the switch 181 is thereby turned on. In this case, the rotatable operation members 30 to 34 are rotated between the peripheries 20R of the case and. the support members 144 as the finger moves.

Figure 12:
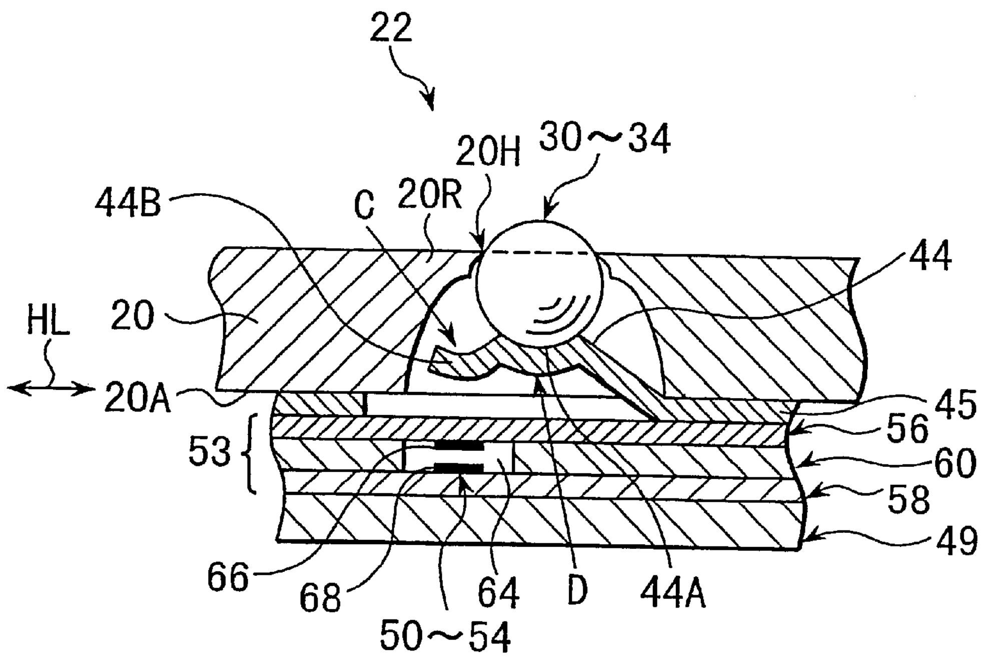
FIG. 12 is a diagram for illustrating an exemplary cross section along the line C—C of the input device shown in FIG. 11.
Figure 13:
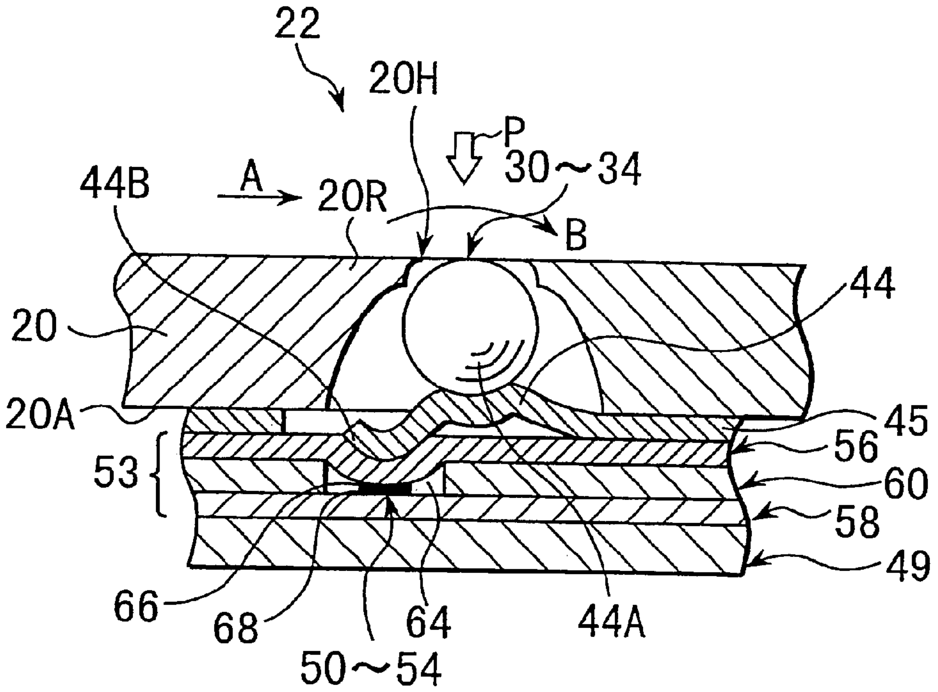
FIG. 13 is a diagram for illustrating the rotatable member that is being pressed in FIG. 12.

FIG. 11 to FIG. 13 show another embodiment of the input device of the present invention. A music player 11 shown in FIG. 11 has the same structure as that of the music player 11 shown. in FIG. 1 excepting that the slit 40 shown in FIG. 1 is not provided. Therefore, a portion of each of the operation rotatable members 30 to 34 is projected directly from the front surface of the case 20. The structure is shown in FIG. 12. The structure shown in FIG. 12 and FIG. 13 is the same as the structure shown in FIG. 2 and FIG. 3, respectively, excepting that the slit 40 is not provided. Therefore, because other components of the embodiment shown in FIG. 11 to FIG. 13 are the same as those of the embodiment shown in FIG. 1 to FIG. 3, the detailed description of those components are omitted.

Figure 14:
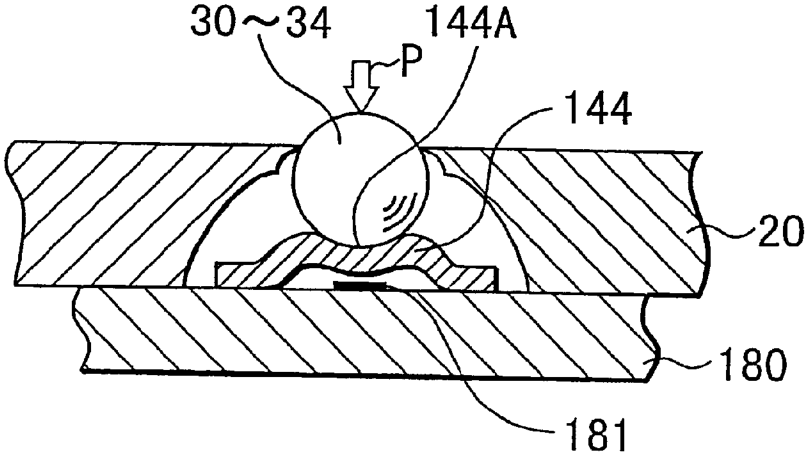
FIG. 14 is a diagram for illustrating further another embodiment of the present invention.
Figure 15:
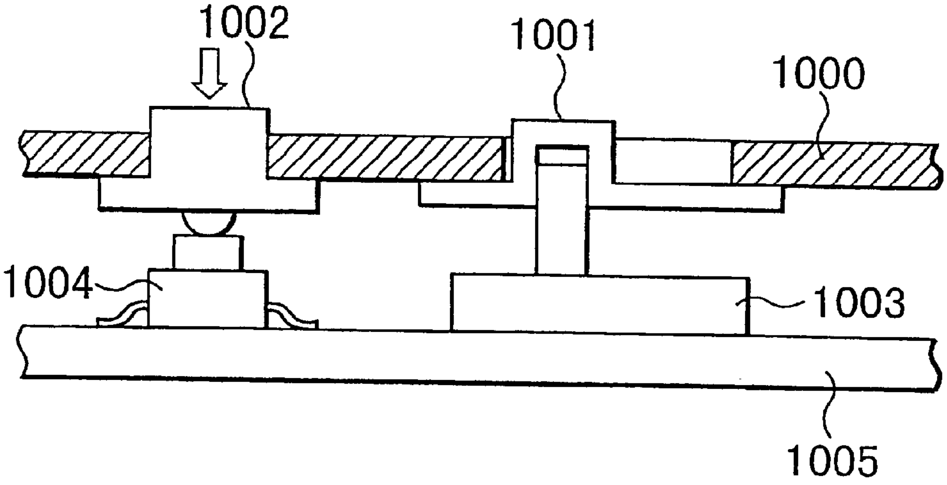
FIG. 15 is a diagram for illustrating a conventional input device.
Figure 16:
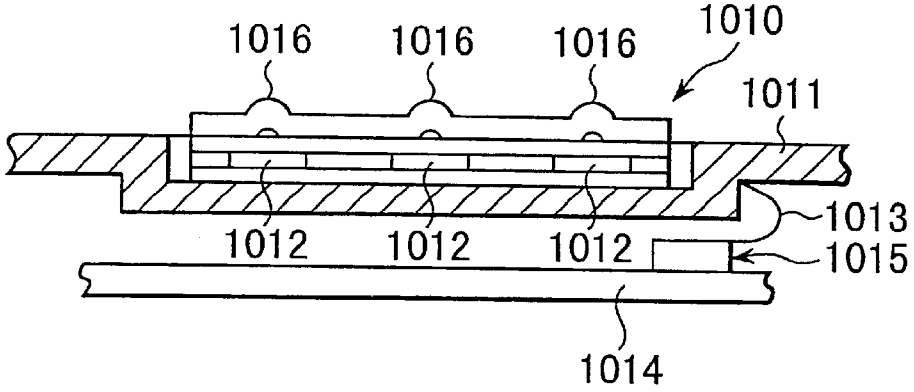
FIG. 16 is a diagram for illustrating another conventional input device.

FIG. 14 shows another embodiment corresponding to FIG. 10 The structure of the embodiment shown in FIG. 14 is the same as that of the embodiment shown in FIG. 10 excepting that the slit 40 is not provided. Because other components are common, the same characters are given to the same components and detailed description of those components are omitted.

In this embodiment of the present invention, a ball that is used as the key top of the switch is pressed with a finger to press down the sheet- spring like support member, and the sheet switch is turned on.

The spherical rotatable member is held between the inclined hole of the case and the plate- spring like support member and is pressed always onto the case side by means of the plate spring like support member.

The plate spring- like support member for holding the ball has a configuration for turning on the sheet switch. One plate metal having a plurality of plate- spring like support members for pressing a plurality of contacts separately is provided at the position corresponding to the rotatable members.

The case, support member sheet, and reinforcing plate are combined together into one piece by means of adhesion, welding, or caulking.

For example, when a finger is slid in either the X1 or X2 direction. shown in FIG. 2, the rotatable member is rotated, friction. between the finger and the rotatable member changes from sliding to rolling, the friction coefficient $\mu$ between the finger and the rotatable member is reduced, and as the result the tactile operational sensation is significantly improved and a luxurious appearance is given. For example, the color of the rotatable members is differentiated from the color of the case, or the color of the rotatable members is differentiated each other, and thus the appearance is improved with this feature.

The present invention will not be limited to the above-mentioned embodiments, and various modifications may be applied.

The microcomputers 80 and 84 shown in FIG. 4 may be structured by a single microcomputer.

The input device 20 shown in FIG. 1 shows an example in which the input device 20 is provided to a portable music player. The music player including the input device may be a hand-held music data player, may be a type that is attached on an arm, may be a type that is hung from a neck, or may be another type.

The input device of the present invention may be applied not only to the music or music data player but also the music data recording/reproducing apparatus. The input device of the present invention may be applied not only to the music data recording/reproducing apparatus but also the image and audio recording/reproducing apparatus or image and audio data player.

The shape of the rotatable operation member is by no means limited to the ball. A cylinder shape, hollow cylinder shape, or rugby ball shape may be employed. Any-way, the rotatable members are rotatable along the arranging direction of the rotatable operation members; and, the rotatable members are necessarily rotated when the finger moves along the rotatable members for operation.

The input device of the present invention may be applied not only to the above-mentioned embodiment but also to electronic apparatus of other that are and used in other fields.

What is claimed is:

1. An input device info which an operator enters desired commands by operating with a finger comprising;

a case, a switch contact provided in the inside of said case having a hole communicating to the outside of said case, an rotatable operation member provided rotatably to said switch contact and disposed partially projecting from said hole of said case, and a support member for supporting said rotatable operation member by pressing it onto said hole of said case side and actuating electrodes provided to said switch contact to be connected when said rotatable operation member is pressed from the outside of said case.

2. The input device as claimed in claim 1, wherein a slit is formed on said case, and said rotatable operation member is disposed in said slit.

3. The input device as claimed in claim 1, wherein said input device has a plurality of said switch contacts, a plurality of said operation rotatable members, and a microcomputer for selecting an operation mode from among different operation modes by operating an arbitrary switch selectively from among said plurality of switch contacts.

4. The input device as claimed in claim 3, wherein said operator moves a finger along said slit thereby to operate an arbitrary switch contact selectively from among said plurality of switch contacts for activating an operation mode.

5. The input device as claimed in claim 1, wherein said each switch is assigned to one operation type.

6. The input device as claimed in claim 4, wherein the moving direction of a finger of said operator is the first direction along the longitudinal direction of said slit or the second direction that is opposite to said first direction.

7. The input device as claimed in claim 3, wherein when said switch is operated a plurality of times in a predetermined time, said device is operated in an operation mode corresponding to the number of repeated operations.

* * * * *